(12) United States Patent  
Somanath et al.

(10) Patent No.: US 9,392,189 B2  
(45) Date of Patent: Jul. 12, 2016

(54) MECHANISM FOR FACILITATING FAST AND EFFICIENT CALCULATIONS FOR HYBRID CAMERA ARRAYS

(71) Applicants: Gowri Somanath, Santa Clara, CA (US); Yi Wu, San Jose, CA (US)

(72) Inventors: Gowri Somanath, Santa Clara, CA (US); Yi Wu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 14/193,934

(22) Filed: Feb. 28, 2014

(65) Prior Publication Data

US 2015/0249791 A1    Sep. 3, 2015

(51) Int. Cl.
| | |
|---|---|
| *H04N 5/247* | (2006.01) |
| *H04N 5/262* | (2006.01) |
| *G06K 9/62* | (2006.01) |
| *H04N 5/232* | (2006.01) |

(52) U.S. Cl.  
CPC .............. *H04N 5/262* (2013.01); *G06K 9/6201* (2013.01); *H04N 5/23206* (2013.01); *H04N 5/247* (2013.01)

(58) Field of Classification Search  
CPC . H04N 5/23293; H04N 5/23219; H04N 5/77; H04N 9/8205; H04N 5/23222  
USPC ............... 348/47, 48, 139, 153, 159, E13.022  
See application file for complete search history.

(56) References Cited

U.S. PATENT DOCUMENTS

| | | | |
|---|---|---|---|
| 8,274,564 B2* | 9/2012 | Girgensohn | H04N 5/247 348/143 |
| 8,432,443 B2* | 4/2013 | Nam | G06T 7/0042 348/135 |
| 2012/0218437 A1* | 8/2012 | Hermary | G01B 11/245 348/222.1 |
| 2015/0055886 A1* | 2/2015 | Oh | G06T 11/00 382/284 |
| 2015/0163478 A1* | 6/2015 | Geiss | H04N 13/0242 348/47 |

* cited by examiner

*Primary Examiner* — Hung Lam  
(74) *Attorney, Agent, or Firm* — Blakely, Sokoloff, Taylor & Zafman LLP

(57) ABSTRACT

A mechanism is described for facilitating efficient computation for hybrid camera arrays at computing devices according to one embodiment. A method of embodiments, as described herein, includes selecting a camera to serve as a reference camera, where the camera is selected from a plurality of cameras in a hybrid camera array, performing matching across images obtained from multiple camera pairs of the plurality of cameras, and selecting one or more best camera pairs of the multiple camera pairs based on at least one of placement, type, and history associated with each camera of the multiple camera pairs.

23 Claims, 6 Drawing Sheets

MECHANISM FOR FACILITATING FAST AND EFFICIENT CALCULATIONS FOR HYBRID CAMERA ARRAYS

FIELD

Embodiments described herein generally relate to computers. More particularly, embodiments relate to a mechanism for facilitating fast and efficient calculations for hybrid camera arrays.

BACKGROUND

Hybrid camera array technology is a fundamental revolution in imaging industry which typically includes an array of cameras with different sensors, lens, and controls. A hybrid camera array can enable many compelling user experiences, including three-dimensional (3D) media capture, high dynamic range (HDR) imaging, easy editing tools, augmented reality and interaction, high-speed video, and many more, on mobile, ultra-mobile, desktop and television platforms, etc. Hybrid camera array technology is fast growing and becoming increasingly important; however, applying traditional techniques can be inefficient.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
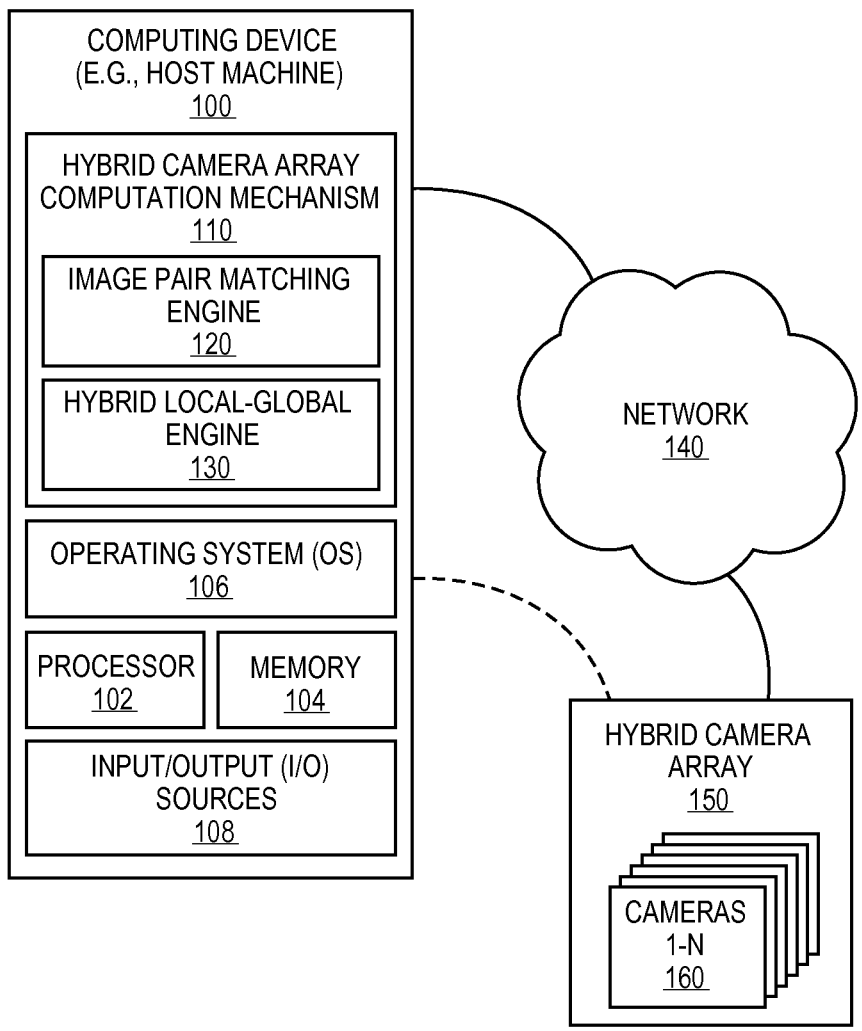
FIG. 1 illustrates a hybrid camera array computation mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

A hybrid camera array provides multiple combinations of image pairs from different sensors to be matched; however, matching all possible pairs by conventional techniques is not computationally efficient and does not guarantee the best result. Embodiments provide for performing intelligent matching across a hybrid set of images detected within a hybrid camera array. Embodiments provide for a framework with a set of rules for a hybrid camera array where the rules are employed and used for taking advantage of the hybrid set of sensors and retaining robustness from matching images from similar sensor types. Embodiments provide for generating camera pairs for image matching in hybrid camera arrays by identifying and selecting best sets of cameras pairs for matching by, for example, (1) maximizing the matching within same camera types within the hybrid camera array, (2) minimizing the matching across different camera types, (3) maximizing depth range by matching the farthest cameras (e.g., longest baseline), and (4) robustly utilizing the in-between cameras to efficiently handle occlusions and near-range depth.

Embodiments further provide for obtaining a final disparity map by combining results from a local and global approach. In one embodiment, a hybrid approach is employed to combine both the local and global approaches where an initial disparity map is obtained through a local algorithm. For example, for pixels where the result is noisy or inconsistent, a global approach is applied only in those neighborhoods. In other words, embodiments may combine a local approach that may be fast, with a global optimization that may be smooth and dense, to obtain a resulting dense and smooth disparity map with lower computational costs.

Conventional global algorithms solve the optimization problem at each pixel which costs a great deal of computation time and memory. Embodiments provide for adaptively selecting a subset of pixels and exclusively running the global optimization (for e.g., alpha-expansion or alpha-beta swap) on the selected pixels so as to achieve a reduced network of pixels and labels to allow for a faster convergence and lower use of processing memory. For example and in one embodiment, a final disparity map is obtained by combining results from both the local and global approaches by performing a fast local approach (e.g., block matching algorithm) to calculate disparity for each pixel. The confidence of calculated disparity at each pixel is determined through two measures. A subset of pixels that fails the confidence measures may go through the global approach, where for pixels passing the confidence measures, their result of local block matching is retained, while the global optimization determines the disparity at other pixels.

Embodiments provide for the aforementioned techniques to overcome any number of conventional challenges, by (1) achieving lower computation time, (2) lowering memory requirements, and (3) parallelizing. Since the optimization may be exclusively performed on the selected subset of pixels, the total time may be lower compared to any of the conventional approaches. Further, the reduced number of pixels lowers the memory requirements. From the subset of pixels selected for global optimization, the algorithm may be run in parallel for each connected component (in two-dimensional (2D)) in parallel, combining the features of both the local and global approaches.

Further, embodiments are not limited to any particular type of arrays and/or cameras and may be applied to any number and type of hybrid camera arrays having any number and type of cameras, such as embodiments may be applied to any multi-camera systems for selection of the best camera pair and/or calculation of the disparity map. Such multi-camera systems or arrays may include one or more of (but not limited to) Pelican® camera system, HTC® EVO™ camera smartphones, LG® Optimus G™ stereo camera smartphones, etc., and/or multi-camera software systems, such as Adobe® system. Hybrid camera array having an array of cameras with different sensors, lenses, and controls, etc., is being regarded as a revolution in the image industry. For example, hybrid camera arrays can enable compelling user experiences, such as 3D media captures, high dynamic range (HDR) images, innovative editing tools, augmented reality and interactions, high speed videos, etc., on any number and type of computing device, such as mobile devices, ultra-mobile devices, wearable devices, desktops, laptops, television platforms, etc.

FIG. 1 illustrates a hybrid camera array computation mechanism 110 according to one embodiment. Computing device 100 serves as a host machine for hosting hybrid camera array computation mechanism ("computation mechanism") 110 and that includes any number and type of components, such as image matching engine ("image engine") 120 and hybrid local-global engine ("hybrid engine") 130, facilitate fast and efficient computations for hybrid camera array (also referred to as "HCA" or simply "array") 140 having any number and type of cameras 1-N 150. It is to be noted that "N" and similar designators are intended to be variables representing any positive integer. As illustrated, in one embodiment, camera array 140 may be external to and directly in communication with computing device 100 or indirectly over one or more networks, such as network 130 (e.g., Internet, cloud network, proximity network, etc.). Further, in another embodiment, the camera array camera array 140 or one or more of cameras 150 may be included within computing device 100. Camera array 140 may include 2D and/or 3D camera in which optical centers of cameras 150 may be (approximately) situated in a common plane in 3-D space and (approximately) arranged in multiple rows and columns within their common plane.

Computing device 100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™ system, etc.), e-readers (e.g., Kindle® by Amazon®, Nook® by Barnes and Nobles®, etc.), smart televisions, wearable devices (e.g., watch, bracelet, smartcard, jewelry, clothing items, etc.), media players, etc.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", and "software package" may be used interchangeably throughout this document. Similarly, terms like "job", "input", "request" and "message" may be used interchangeably throughout this document.

Figure 2A:
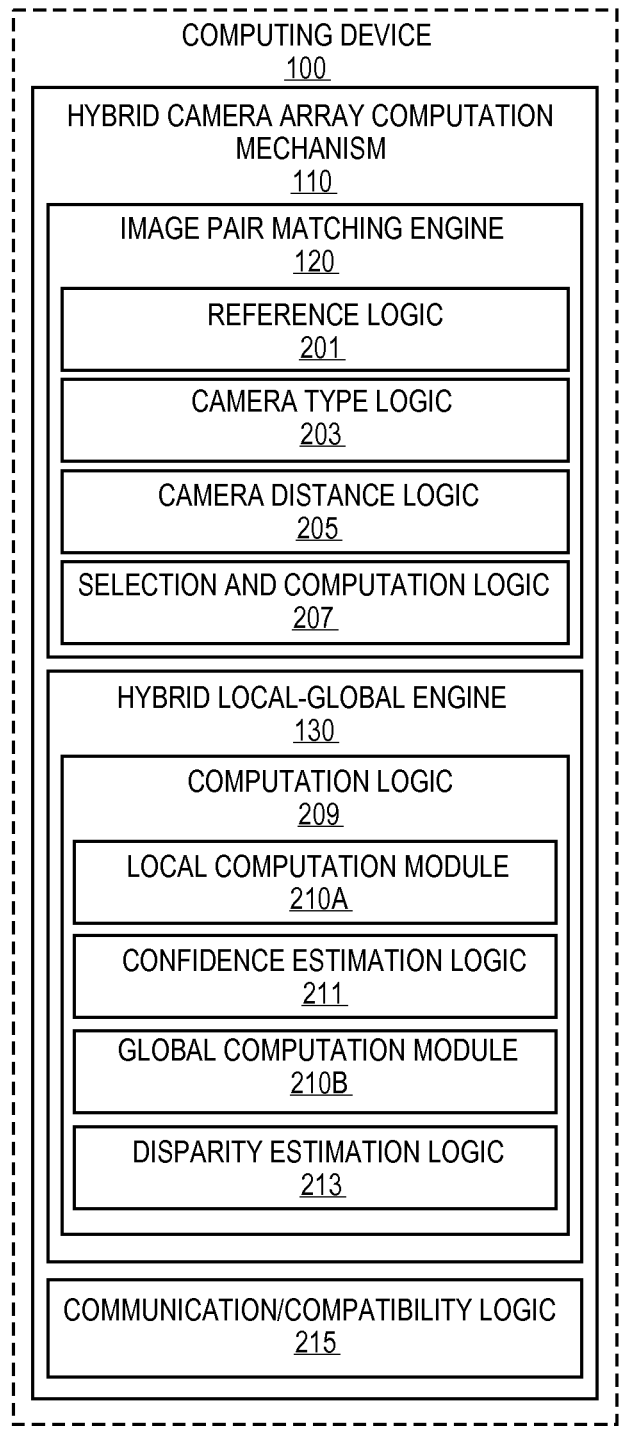
FIG. 2A illustrates a hybrid camera array computation mechanism according to one embodiment.

FIG. 2A illustrates a hybrid camera array computation mechanism 110 according to one embodiment. In one embodiment, computation mechanism 110 includes any number and type of components, such as image engine 120 having one or more of reference logic 201, camera type logic ("type logic") 203, camera distance logic ("distance logic") 205, and selection and computation logic 207; and hybrid engine 130 having one or more of computation logic 209 having local computation module ("local module") 210A and global computation module ("global module") 210B, confidence estimation logic 211, and disparity estimation logic 213. Computation mechanism 110 may further include communication/compatibility logic 215.

As will be further described with reference to FIG. 2B, image engine 120 provides a novel and innovative framework proposing multiple rules that are designed to take advantage of the hybrid set of camera sensors such that any number of combinations of image pairs obtained from the different sensors to obtain a robust pair of images from various cameras in an array, such as cameras 1-N 160 of hybrid camera array 150 of FIG. 1. For example, instead of simply matching similar cameras, etc., the proposed rules may be used to sense and use for computation even those image views from different cameras that may be conventionally lost in comparison.

In one embodiment, reference logic 201 of image engine 120 may be used to select a single camera of a set of cameras in a hybrid camera array as a reference camera to which other cameras may be compared in terms of their type, distance, etc. Upon selecting the reference camera, using type logic 203, the reference logic may then be compared to or matched with each of the other camera of the same type within the array in accordance to rule 1. Similarly, for example, in accordance with rule 2.1 of rule 2, distance logic 205 may be used to compare the reference camera with the closest (in distance) camera of each of the other types of camera within the array. Rule 2.2 of rule 2 may then be applied with selection and computation logic 207 to compare the pairs of cameras within the same camera type but different from reference camera type and neither camera has been matched with the reference camera as part of rule 2.1.

In one embodiment, rule 3 is then applied having selection and computation logic 207 to select a pair of cameras (of the same type) for computation that was not previously selected and that has the largest baseline or distance between them. The selected camera pairs are the best camera pairs for matching, which maximizes the matching within the same camera types while minimizing the matching cross between different camera types without losing the longest baseline benefits and in-between camera views. In other words, image engine 120 takes advantage of the hybrid set of camera sensors while, at the same time, retains robustness from matching images from similar sensor types.

In one embodiment, hybrid engine 130 may be triggered to obtain a final disparity map through computation logic 209 having local and global computation modules 210A, 210B, confidence estimation logic 211, and disparity estimation logic 213. As will be further described with reference to FIG. 3B, local computation module 210A is used to perform local computation including computing data cost and obtaining an initial disparity map. Confidence estimation logic 211 then checks for any inconsistencies within the initial disparity map that was obtained through the location computation. Upon checking, in one embodiment, any pixels that fail the confidence measures then go through the global computation being performed by global computation module 210B to obtain global optimization which may then lead to getting the final disparity map as provided by disparity estimation logic 213.

Figure 2B:
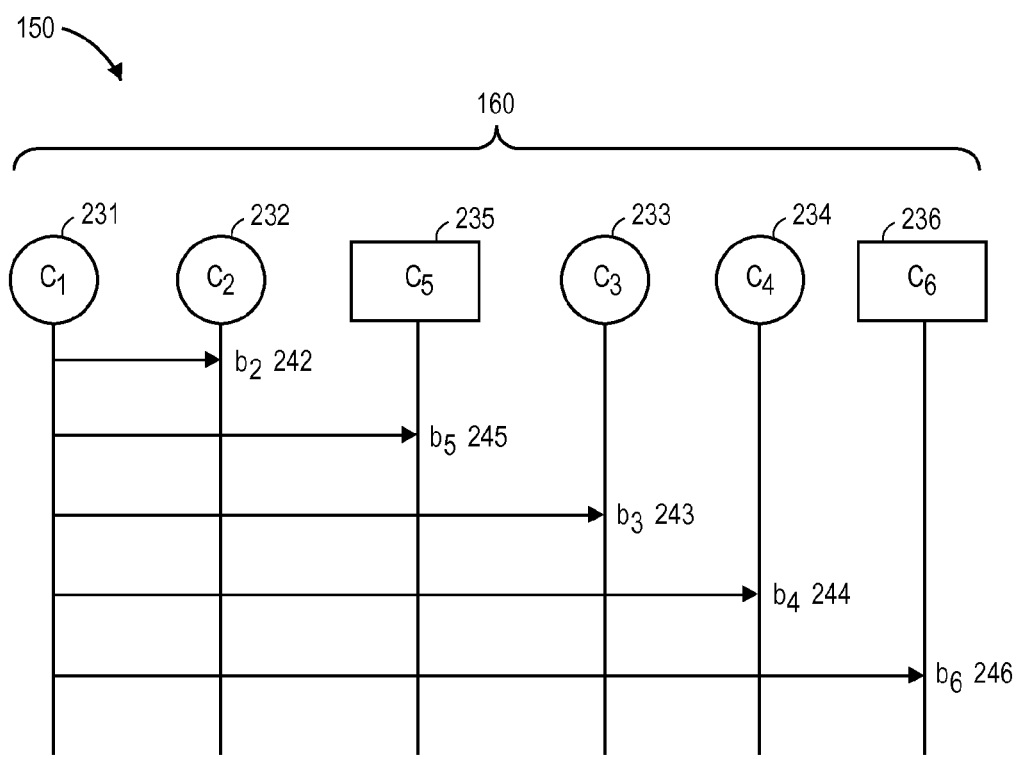
FIG. 2B illustrates a camera pair selection and a disparity map selection by an image matching engine and a hybrid local-global engine, respectively, of FIG. 2A at a hybrid camera array of FIG. 1 according to one embodiment.

FIG. 2B illustrates a camera pair selection and a disparity map calculation by an image matching engine 120 and a hybrid local-global engine 130, respectively, of FIG. 2A at a hybrid camera array 150 of FIG. 1 according to one embodiment. In the illustrated embodiment, array 150 includes cameras 1-N 160 of which cameras C1 231, C2 232, C3 233, C4 234, C5 235, and C6 236 are illustrated. It is to be noted that the various shapes of cameras 231-236 represent various types of cameras, such as circles or circular cameras 231-232, 233-234 represent a first type of cameras while rectangles or rectangular cameras 235, 236 represent a second type of cameras. Examples of different types of cameras include (but not limited to) (i) 8 megapixel (MP) red, green, and blue (RGB) camera with auto-focus, (ii) 1.3 MP fixed-focus RGB camera, etc. It is contemplated that any number and type of cameras may be employed and that embodiments are not limited to the ones illustrated here in FIG. 2B. In addition to the types, various distances (also referred to as "baselines") b2 242, b3 243, b4 244, b5 245, b6 246 between camera C1 231 and other cameras C2-C6 232-236 are illustrated. For example, b2 242 represents the distance between camera C1 231 and C2 232, b4 244 represents the distance between C1 231 and C4 234, etc.

With regard to the selecting a camera pair through image matching, as described with reference to FIG. 2A, for hybrid camera array 150 having a set of sensors associated with cameras 231-236, let types $T=\{T_1, T_2, \ldots, T_n\}$ and a set of cameras $C_i$ of type $T_i$. Let N be the total number of cameras, which in this case is 6. Let $c_r \epsilon C^r$ be designated as the reference camera, which in this case is camera C5 235. In the calibration information, let the distances or baselines be $b=\{b_1, b_2, \ldots, b_N\}$, where b1=0 since C1 231 is at 0 distance from itself, corresponding to cameras $\{c_1, c_2, \ldots, c_N\}$, where the baselines are represented with respect to one of the cameras, which in this case is camera C1 231. Now, for example, with regard to $\{T_H, T_L\}$, $T_H$={8 MP RGB camera with auto-focus} (here, for example, the rectangle cameras, C5-C6 235-236) and $T_L$={1.3 MP fixed focus RGB camera} (here, for example, the circle cameras C1-C4 231-234). Let reference camera $c_r=c_5$, where $C^L=\{c_1, c_2, c_3, c_4\}$, $C^H=\{c_5, c_6\}$, where, as previously discussed, b2-b6 242-246 represent the associated baselines.

Given the set of cameras 231-236, there are multiple pairs that can be matched and combined to obtain a disparity/depth map; however, a subset of pairs (including just one pair) may be chosen using the proposed rules applied by image engine 120 as described with reference to FIG. 2A. With regard to the proposed rules, let M represent a matching function, such as $M(c_i, c_j, \phi_p)$ represents matching images from cameras $c_i$ & $c_j$, where $\phi_p$ defines various matching parameters used for that camera pair. Matching parameters may include one or more of (but not limited to) the type of matching functions to use, weights of using color/gradient image in matching, and weights of this matching pair in overall matching, etc. Matching functions may be one or more of (but not limited to) a sum of square difference of color/gradient at each pixel or block of pixels, a sum of absolute differences, and cross-correlation functions, etc.

Rule 1

In one embodiment, rule 1: $M(c_r, c_i, \phi_1)$ $\forall c_i \epsilon C^r$ and $c_i \neq c_r$. Rule 1 facilitates matching a reference camera, such as camera C5 235, to each of the other camera of the same type, such as camera C6 236, in array 150 (e.g., both C5 235 and C6 236 being rectangular are considered the same type of cameras). In the illustrated embodiment, rule 1 matches cameras C5 235 and C6 236, such as $M(c_5, c_6, \phi_1)$, wherein C5 235 is set as a reference using reference logic 201 while the matching of C5 235 and C6 236 is performed using type logic 203 of FIG. 2A.

Rule 2 (2.1)

Further, in one embodiment, in sub-rule 2.1 of rule 2, for each $C^k \neq C^r$, $M(c_r, c_i, \phi_2) \ni (1) c_i \epsilon C^k$, and $(2)|b_r-b_i|=\min(|b_r-b_j|)$, $\forall b_j \epsilon C^k$. Rule 2.1 facilitates matching the reference camera, such as camera C5 235, to the closest camera of each of the other type, such as cameras C2 232 and C3 233. It is contemplated that any number of types of cameras be included in array 150; however, given the two illustrated types here, as symbolized by circles and rectangles, the reference camera, C5 235, being a rectangle of type, for example, 8 MP RGB camera with auto-focus, is compared to the two nearest other-type cameras, C2 232 and C3 233, being circles of type, for example, 1.3 MP fixed focus RGB camera. Accordingly, in the illustrated embodiment, rule 2.1 is performed as $M(c_5, c_2, \phi_2)$ & $M(c_5, c_3, \phi_2)$ via distance logic 205 of FIG. 2A.

Rule 2 (2.2)

Similarly, sub-rule 2.2 of rule 2 facilitates a matching of cameras pairs within the same camera type but different from reference camera type and neither camera has been matched with the reference camera, C5 235. For example let U={set of cameras selected in rule 2.1}, where $M(c_i, c_j, \phi_3) \ni c_i \epsilon U$, $c_j \epsilon U$, $c_j \epsilon C^k$. For matching pairs of cameras of type $C^k$ that are not previously matched with the reference camera, C5 235, as illustrated with FIG. 2B, U−{$c_2, c_3$}, rule 2.2 is performed as $M(c_2, c_1, \phi_3), M(c_2, c_4, \phi_3), M(c_3, c_1, \phi_3)$ and $M(c_3, c_4, \phi_3)$ via selection and computation logic 207 of FIG. 2A.

Rule 3

In one embodiment, with regard to rule 3, let $(c_a, c_b, \phi_4)$−$\max_{\forall C^k, c_i, c_j \epsilon C^k}|b_i-b_j|$. Rule 3 is applied, via selection and computation logic 207 of FIG. 2A, facilitates seeking any camera pairs that are not previously matched by any of rules 1 and 2. For example, a pair of cameras of the same type which form the largest baseline between them is identified and selected and if that pair has not been matched during the application of any of the previously-applied rules 1 and 2, the selected pair is matched now as part of the application of rule 3, such as by applying $M(c_a c_b, \phi_4)$, where using the illustrated embodiment, $M(c_a c_b, \phi_4)$ corresponds to $M(c_1, c_4, \phi_4)$.

Accordingly, in one embodiment, applying the proposed rules 1-3, the optimal sets of camera pairs are identified for matching, to maximize the matching within the same camera types and minimize the matching across different camera types without having to lose the longest baseline benefits and in-between camera views while taking advantage of the hybrid set of sensors associated with cameras 231-236 while retaining the robustness from obtaining matching images from similar sensor types. Further, in some embodiments, the selected camera pair, such as camera C1 231 and C4 234, and the relevant data may be used for obtaining the best disparity map as will be further described below.

In one embodiment, using hybrid engine 130 may be used to estimate a best disparity map that is based on finding correspondence between pixels in multiple images obtained from multiple cameras of the hybrid camera array 150. For example, finding a precise location in other images of a scene point detected for a given pixel in a single image (e.g., a reference image from a reference camera, such as camera C5 235). It is the shift in position of a corresponding pixel in one image with respect to the reference image is referenced as disparity, where disparity is estimated through the process of image matching, such as through a disparity estimation algorithm as employed and facilitated by hybrid engine 130.

For example and in one embodiment, using two or more rectified images from a multi-camera array 150, a dense disparity map may be obtained by hybrid engine 130, where the dense disparity map refers to a map having a disparity estimate at each pixel of the reference image. The reference image may be selected from a set of input images having any number and type of images from any number and type of cameras 231-236 and that is not limited to any particular type of camera or a form of image, such as 2D or 3D, etc.

In one embodiment, hybrid engine 130 may facilitate computation logic to be used to obtain the best disparity map based on a combination of both the local and global computation approaches. For example, local approach or algorithm may include block matching which aims to find a matching for a given pixel without having to take into account disparity/matching result for neighboring pixels. However, to avoid any noise and resulting inconsistencies for adjacent pixels typically associated with the local approach, it may be selectively combined with a global approach or algorithm which may define a global optimization model considering a larger collection of pixels. For example, the global approaches may formulate disparity estimation as a labeling problem on the images modeled as, for example, a Markov Random Field. The MRF may then be solved by applying the algorithm of alpha-expansion (also referred to as "graph-cut") to provide spatially smooth results.

In one embodiment, using hybrid engine 130, a hybrid approach is offered that combines both the local and global approaches. As aforementioned, an initial disparity map may be obtained through a local algorithm, via local module 210A, and subsequently, a global approach is applied, via global module 210B, for those pixels that are found to be inconsistent or noisy. Further, instead of solving the global optimization for each pixel which can add to the computation time, a subset of pixels is selected and the alpha-expansion algorithm is applied to selected subset of pixels. This reduced network of pixels and labels allow for faster convergence and use lower processing memory, while this combination of the global approach with the local approach also keeps the computational expenses low.

For example and in one embodiment, for computation of a final disparity map using hybrid engine 130 of FIG. 2A, let I={set of rectified input images}, where $I_r \in I$ is the reference image, and disparity at each pixel is formulated as a labeling problem. Further, P is the set of pixels in the image, where L={$L_1$, $L_2$, . . . , $L_{max}$} is the set of labels corresponding to disparities, f is labeling that assigns a label $f_p \in L$ to each pixel $p \in P$. Using the graph-cut/alpha expansion, the energy formulation to be minimized is: $M(f)=\Sigma_{p \in P}D(f_p)+\Sigma_{(p,q) \in N}V(p, q, f_p, f_q)$. The first term in the summation may be referred to as "data cost" while the second may be referred to as "smoothness cost" and N may be referred to as a neighborhood as further defined below.

Data Cost

In one embodiment, data cost may be used to determine the cost of assigning a label, $f_p$ to pixel p. Further, D(p,f) may be used to indicate the cost of assigning a label f to p. Using computation logic 209 of FIG. 2A, data cost may be calculated using matching across the input images by measuring the difference in color, gray-scale, gradient, and/or any filtered information, etc. For example, using color and/or gradient, the cost of matching $I_r$ & $I_i \in I$ at pixel p is $C_i(p)=w_c|I_r^c(p)-I_i^c(p+b_i f_p)|+w_g|I_r^g(p)-I_i^g(p+b_if_p)|$, where $I_r^c$ corresponds to color and $I_r^g$ corresponds to gradient of associated image, $b_i$ is determined by the calibration information for image $I_i$ and $w_c$ & $w_g$ are scalar weight parameters of color and/or gradient. Further, $D(f_p)=S(C_i(p))$ where S refers to a selection function applied to a set of costs from the multiple image pairs, which, for example, may be a minimum operator or the sum of all/subset of costs. For array 150, five sets of pair-wise costs may be generated at each pixel by matching the image from C1 231 to other cameras, C2-C6 232-236.

Accordingly, data cost at that pixel may be (1) a sum of all five costs, or (2) a sum of four of the least costs, or any other such function of choice.

Smoothness Cost

In one embodiment, smoothness cost may be used to determine the cost of assigning $f_p$ to p & $f_q$ to q, where p & q are neighboring pixels as defined by N. In some embodiments, 4 or 8 neighborhood may be used, where $V(p, q, f_p, f_q)=\lambda|f_p-f_q|e^{-|I_r^c(p)-I_r^c(q)|/\alpha}$, where $\lambda$ and $\alpha$ refer to scalar parameters. This cost may be determined only by looking at neighboring pixels of the reference image and intuitively, pixels with the same color are likely to belong to the same object and therefore may have same disparity. Further, this way, the above cost may be low if the two neighboring pixels get assigned closer disparities (e.g., as measured by $|f_p-f_q|$), and their color difference is low (e.g., as measured by the exponential term).

Block-Matching Disparity

In embodiment, computation logic 209 of FIG. 2A may be used for determining block-matching disparity may by a greedy selection of the label at each pixel that has the least cost, where block-matching disparity may be represented as $B(p)=\text{argmin}_{f \in L}(D(p,f))$.

In one embodiment, M(f) may be optimized at a subset of the pixels in the image, where the selection of this subset may be done using the confidence measures described below, while at other pixels the block-matching disparity may be used.

Confidence

In one embodiment, confidence estimation logic 211 of FIG. 2A may be used for estimation of confidence. For example, let error $E(p)=\min_{f \in L}(D(p,f))$ represent the least cost at each pixel, where E forms an error map of the same size as the image and the disparity map. The two measures may be defined as:

$$\kappa_1(p) = \begin{cases} 1, & E(p) < \tau_1 \\ 0, & otheriwse \end{cases}$$

$$\kappa_2(p) = \begin{cases} 1, & R(p) < \tau_2 \\ 0, & otheriwse \end{cases}$$

Where R is the gradient of block-match disparity B and $\tau_1 \tau_2$ are scalar thresholds.

The final confidence map may be defined as:

$$\kappa_1(p) = \begin{cases} 1, & \kappa_1(p) = 1 \text{ or } \kappa_2(p) = 1 \\ 0, & otheriwse \end{cases}$$

For example and in one embodiment, two broad categories of pixels having noisy matches throughout block-matching may be selected, where first areas having no-texture or ambiguous textures, while second areas having spatially noisy characteristics, such as occlusions and/or low image quality. A first confidence measure handles the first type of areas, where texture-less or ambiguous regions tend to misleadingly have very low errors. For a second confidence measure, a well-accepted heuristic is utilized such that most real world scenes are spatially smooth and do not have very high variations in depth within a small region. This is quantitatively measured through the gradient in disparity as done in the second confidence measure. The final confidence measure combines the two above-mentioned measures.

The final disparity map combines the local (e.g., block-match) disparity calculation with the global (e.g., graph-cut/alpha expansion) disparity calculation, as follows:

$$d(p) = \begin{cases} B(p), & \kappa(p) = 0 \\ G(p), & otheriwse \end{cases}$$

Where B(p) indicates the disparity as suggested by local match and G(p) indicate the disparity as suggested by global optimization.

Computing device 100 may further include any number and type of touch/image components, where these touch/image components may include (but not limited to) image capturing devices (e.g., one or more cameras, etc.) and image sensing devices, such as (but not limited to) context-aware sensors (e.g., temperature sensors, facial expression and feature measurement sensors, etc.) working with one or more cameras, environment sensors (such as to sense background colors, lights, etc.), biometric sensors (such as to detect fingerprints, facial points or features, etc.), and the like. Computing device 100 may also include one or more software applications, such as business applications, social network websites (e.g., Facebook®, Google+®, Twitter®, etc.), business networking websites (e.g., LinkedIn®, etc.), communication applications (e.g., Skype®, Tango®, Viber®, etc.), games and other entertainment applications, etc., offering one or more user interfaces (e.g., web user interface (WUI), graphical user interface (GUI), touchscreen, etc.), while ensuring compatibility with changing technologies, parameters, protocols, standards, etc.

Communication/compatibility logic 215 may be used to facilitate dynamic communication and compatibility between computing device 100 and any number and type of hybrid camera arrays, such as hybrid camera array 150, any number and type of cameras, such as cameras 231-236, any number and type of other computing devices (such as a mobile computing device, a desktop computer, a server computing device, etc.), storage devices, databases and/or data sources (such as data storage devices, hard drives, solid-state drives, hard disks, memory cards or devices, memory circuits, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, such as Facebook®, LinkedIn®, Google+®, Twitter®, etc., business applications, games and other entertainment applications, etc.), programming languages, etc., while ensuring compatibility with changing technologies, parameters, protocols, standards, etc.

Although one or more terms or examples (e.g., hybrid camera arrays, cameras, networks, etc.) may be discussed throughout this document for brevity, clarity, and ease of understanding, it is contemplated that embodiments are not limited to any particular number and type of hybrid camera arrays, cameras, computing devices, users, network or authentication protocols or processes, or the like. For example, embodiments are not limited to any particular network security infrastructures or protocols (e.g., single-sign-on (SSO) infrastructures and protocols) and may be compatible with any number and type of network security infrastructures and protocols, such as security assertion markup language (SAML), OAuth, Kerberos, etc.

Throughout this document, terms like "logic", "component", "module", "framework", "engine", "point", and the like, may be referenced interchangeably and include, by way of example, software, hardware, and/or any combination of software and hardware, such as firmware. Further, any use of a particular brand, word, term, phrase, name, and/or acronym, such as "hybrid camera array", "cameras", "rules", "camera pairs", "baselines", "data cost", "smoothness cost", "confidence", "disparity map", "smartphone", "tablet computer", etc., should not be read to limit embodiments to software or devices that carry that label in products or in literature external to this document.

It is contemplated that any number and type of components may be added to and/or removed from hybrid camera array computation mechanism 110 to facilitate various embodiments including adding, removing, and/or enhancing certain features. For brevity, clarity, and ease of understanding of hybrid camera array computation mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
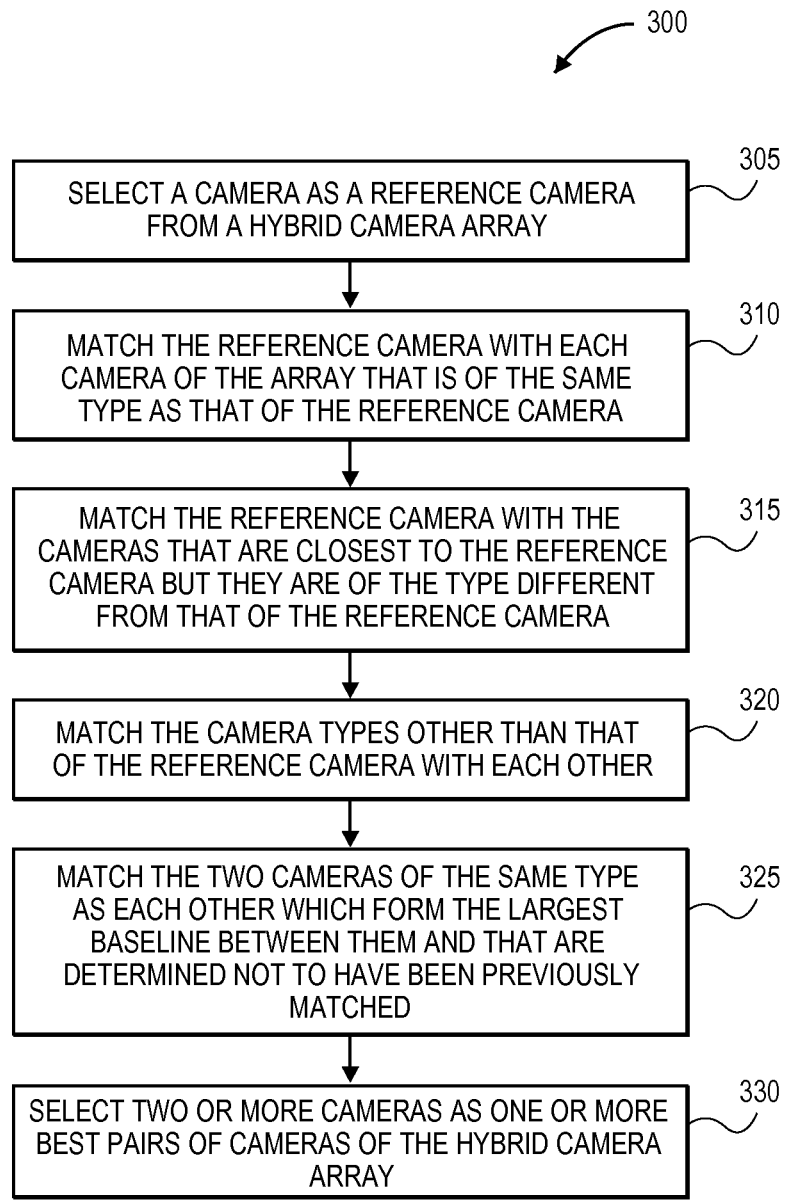
FIG. 3A illustrates a method for facilitating a camera pair selection by an image matching engine of FIG. 2A of a hybrid camera array computation mechanism of FIG. 1 according to one embodiment.

FIG. 3A illustrates a method 300 for facilitating a camera pair selection by an image matching engine 120 of FIG. 2A of a hybrid camera array computation mechanism 110 of FIG. 1 according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by image matching engine 120 of FIG. 2A of hybrid camera array computation mechanism 110 of FIG. 1. The processes of method 300 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1, 2A and 2B in this document are not discussed or repeated here.

Method 300 begins at block 305 with selecting a camera as a reference camera from a hybrid camera array having multiple cameras of different types and at various distances from each other. At block 310, rule 1 is applied such that the reference camera is matched with each of the other cameras of the same type as that of the reference camera. At block 315, sub-rule 2.1 of rule 2 is applied such that the reference camera is matched to the closest cameras, in terms of distance or baseline, but of other types than that of the reference camera. At block 320, sub-rule 2.2 of rule 2 is applied such that camera pairs of types other than that of the reference camera are matched with each other. At block 325, rule 3 is applied such that two cameras of the same type which form the largest baseline between them and not previously matched are now matched. At block 330, two or more cameras are selected as one or more best pairs of cameras of the hybrid camera array and any data or metadata relating to the one or more pairs may then be used for any number of tasks, such as obtaining a better disparity map as, applying the data/metadata to various software applications for faster results and better depth of images, etc. It is contemplated that any number of pairs of cameras may be selected as best pairs.

Figure 3B:
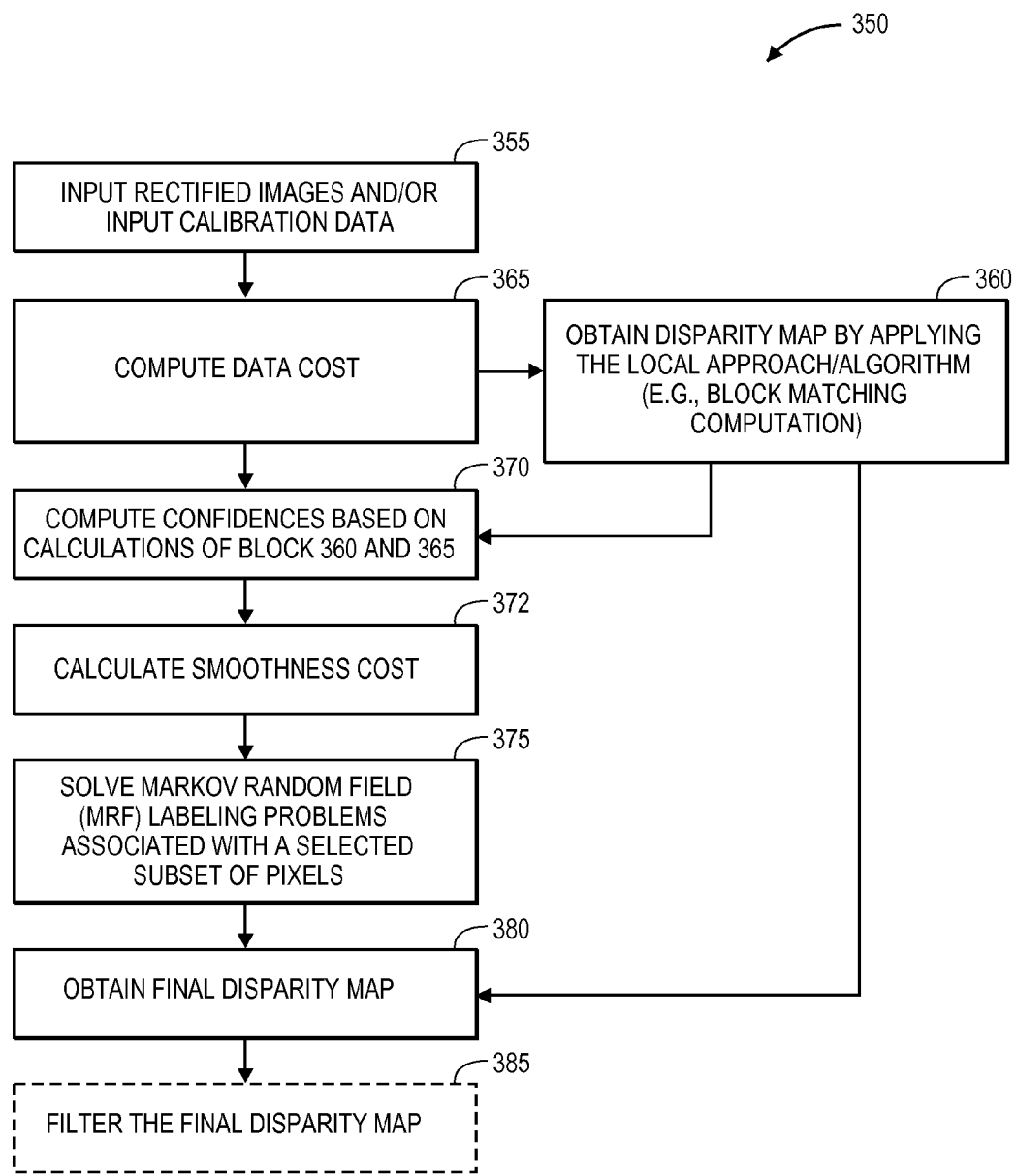
FIG. 3B illustrates a method for facilitating a disparity map computation by a hybrid local-global engine of FIG. 2A of a hybrid camera array computation mechanism of FIG. 1 according to one embodiment.

FIG. 3B illustrates a method 350 for facilitating a disparity map computation by a hybrid local-global engine 130 of FIG.

2A of a hybrid camera array computation mechanism 110 of FIG. 1 according to one embodiment. Method 350 may be performed by processing logic that may comprise hardware (e.g., circuitry, dedicated logic, programmable logic, etc.), software (such as instructions run on a processing device), or a combination thereof. In one embodiment, method 350 may be performed by hybrid local-global engine 130 of FIG. 2A of hybrid camera array computation mechanism 110 of FIG. 1. The processes of method 350 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1, 2A and 2B in this document are not discussed or repeated here.

In one embodiment and as described earlier with reference to hybrid engine 130 of FIG. 2A, local computation may be used to obtain an initial disparity map. Upon obtaining the initial disparity map, confidence measures are performed to check for any inconsistencies (e.g., any pixels failing the confidence measures) within the initial disparity map. In one embodiment, any pixels failing the confidence measures may then go through a global computation to obtain global optimization which then leads to getting a final disparity map. Certain details of the various process involved are provided here with reference to FIG. 3B.

Method 350 begins at block 355 with receiving of input rectified images and/or input calibration data and any other data and/or metadata, such as data/metadata relating to images associated with the one or more pairs of cameras as qualified by the various rules of FIG. 3A. At block 365, data cost is computed. At block 360, using the data cost of block 365, a local approach/algorithm is applied to obtain an initial disparity map.

In some embodiments, at block 370, the information from calculations in block 365 and 360 are employed to compute confidences. At block 372, the smoothness cost is calculated. In one embodiment, global optimization occurs at block 375 where Markov Random Field (MRF) labeling problem associated with a selected subset of pixels are solved, where M(f) may be solved at pixel p, if f κ(p)=1, where G(p) indicate the disparity as suggested by the global optimization. Further, at block 380, a final disparity map is obtained, such as $$d(p) = \begin{cases} B(p), & \kappa(p) = 0 \\ G(p), & otheriwse. \end{cases}$$

This final disparity map may then be optionally additionally filtered at block 385, where filtering may include one or more operations including (but not limited to) median filtering, Gaussian filtering, Bilateral filtering, any smoothing and/or up-sampling, etc.

Figure 4:
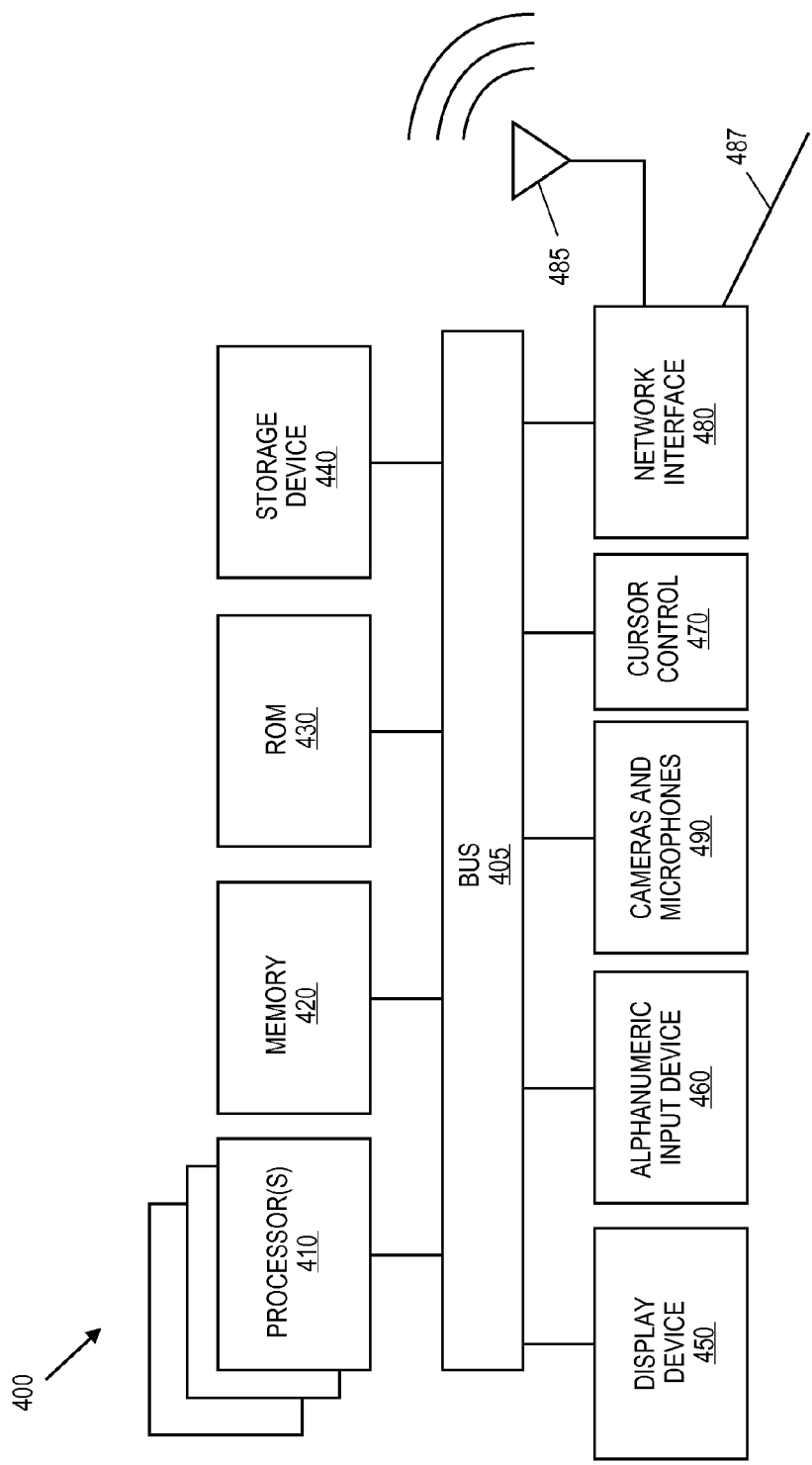
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include computing device 100 of FIG. 1.

Computing system 400 includes bus 405 (or, for example, a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate efficient computation for hybrid camera array systems, comprising: reference logic to select a camera to serve as a reference camera, wherein the camera is selected from a plurality of cameras in a hybrid camera array; and selection and computation logic to perform matching across images obtained from multiple camera pairs of the plurality of cameras, wherein the selection and computation logic is further to select one or more best camera pairs of the multiple camera pairs based on at least one of placement, type, and history associated with each camera of the multiple camera pairs.

Example 2 includes the subject matter of Example 1, wherein the placement includes distance associated with each camera of the multiple camera pairs, wherein the type includes a camera type associated with each camera of the multiple camera pairs, and wherein the history includes a matching history associated with each camera of the multiple camera pairs.

Example 3 includes the subject matter of Example 1, further comprising camera type logic to perform matching of first images obtained from first cameras of the multiple camera pairs to a reference image obtained from the reference camera, if the first cameras are associated with a same camera type as that of the reference camera.

Example 4 includes the subject matter of Example 1 or 3, further comprising camera distance logic to perform matching of second images obtained from second cameras of the multiple camera pairs to the reference image obtained from the reference camera, if the second cameras are closest in distance to the reference camera and of a different camera type as that of the reference camera.

Example 5 includes the subject matter of Example 1, wherein the selection and computation logic is further to select the one or more best camera pairs of the multiple camera pairs for image matching, wherein images from the one or more best camera pairs are determined not to have been previously matched with images from other cameras of the multiple camera pairs.

Example 6 includes the subject matter of Example 1, further comprising computation logic having a local computation module to generate an initial disparity map from independently matching each pixel or block of pixels in one image with each pixel or block of pixels in other images, wherein the initial disparity map is obtained based on an application of a local algorithm.

Example 7 includes the subject matter of Example 1 or 6, further comprising confidence estimation logic to estimate confidences by detecting inconsistent disparity estimates associated with one or more pixels.

Example 8 includes the subject matter of Example 7, wherein the computation logic further comprises a global computation module to generate, via global optimization, a final disparity map by using the estimated confidences relating to the subset of the set of pixels having inconsistent disparity estimates.

Example 9 includes the subject matter of Example 8, wherein the global optimization comprises solving Markov Random Field (MRF) labeling problems associated with the subset of the set of pixels.

Example 10 includes the subject matter of Example 8, wherein the final disparity map is optionally filtered using one or operations comprising: median filtering, Gaussian filtering, Bilateral filtering, smoothing, and up-sampling.

Some embodiments pertain to Example 11 that includes a method for facilitating efficient computation at hybrid camera arrays, comprising: selecting a camera to serve as a reference camera, wherein the camera is selected from a plurality of cameras in a hybrid camera array; performing matching across images obtained from multiple camera pairs of the plurality of cameras; and selecting one or more best camera pairs of the multiple camera pairs based on at least one of placement, type, and history associated with each camera of the multiple camera pairs.

Example 12 includes the subject matter of Example 11, wherein the placement includes distance associated with each camera of the multiple camera pairs, wherein the type includes a camera type associated with each camera of the multiple camera pairs, and wherein the history includes a matching history associated with each camera of the multiple camera pairs.

Example 13 includes the subject matter of Example 11, further comprising performing matching of first images obtained from first cameras of the multiple camera pairs to a reference image obtained from the reference camera, if the first cameras are associated with a same camera type as that of the reference camera.

Example 14 includes the subject matter of Example 11, further comprising performing matching of second images obtained from second cameras of the multiple camera pairs to the reference image obtained from the reference camera, if the second cameras are closest in distance to the reference camera and of a different camera type as that of the reference camera.

Example 15 includes the subject matter of Example 11, further comprising selecting the one or more best camera pairs of the multiple camera pairs for image matching, wherein images from the one or more best camera pairs are determined not to have been previously matched with images from other cameras of the multiple camera pairs.

Example 16 includes the subject matter of Example 11, further comprising generating an initial disparity map from independently matching each pixel or block of pixels in one image with each pixel or block of pixels in other images, wherein the initial disparity map is obtained based on an application of a local algorithm.

Example 17 includes the subject matter of Example 11, further comprising estimating confidences by detecting inconsistent disparity estimates associated with one or more pixels.

Example 18 includes the subject matter of Example 17, further comprising generating, via global optimization, a final disparity map by using the estimated confidences relating to the subset of the set of pixels having inconsistent disparity estimates.

Example 19 includes the subject matter of Example 18, wherein the global optimization comprises solving Markov Random Field (MRF) labeling problems associated with the subset of the set of pixels.

Example 20 includes the subject matter of Example 18, wherein the final disparity map is optionally filtered using one or operations comprising: median filtering, Gaussian filtering, Bilateral filtering, smoothing, and up-sampling.

Example 21 includes at least one machine-readable medium comprising a plurality of instructions that in response to being executed on a computing device, causes the computing device to carry out operations according to any one of the aforementioned examples 11 to 20.

Example 22 includes at least one non-transitory or tangible machine-readable medium comprising a plurality of instructions that in response to being executed on a computing device, causes the computing device to carry out operations according to any one of the aforementioned examples 11 to 20.

Example 23 includes a system comprising a mechanism to carry out operations according to any one of the aforementioned examples 11 to 20.

Example 24 includes an apparatus comprising means to carry out operations according to any one of the aforementioned examples 11 to 20.

Example 25 includes a computing device arranged to carry out operations according to any one of the aforementioned examples 11 to 20.

Example 26 includes a communications device arranged to carry out operations according to any one of the aforementioned examples 11 to 20.

Some embodiments pertain to Example 27 includes a system comprising a storage device having instructions, and a processor to execute the instructions to facilitate a mechanism to perform one or more operations comprising: selecting a camera to serve as a reference camera, wherein the camera is selected from a plurality of cameras in a hybrid camera array; performing matching across images obtained from multiple camera pairs of the plurality of cameras; and selecting one or more best camera pairs of the multiple camera pairs based on at least one of placement, type, and history associated with each camera of the multiple camera pairs.

Example 28 includes the subject matter of Example 27, wherein the placement includes distance associated with each camera of the multiple camera pairs, wherein the type includes a camera type associated with each camera of the multiple camera pairs, and wherein the history includes a matching history associated with each camera of the multiple camera pairs.

Example 29 includes the subject matter of Example 27, wherein the one or more operations comprise performing matching of first images obtained from first cameras of the multiple camera pairs to a reference image obtained from the reference camera, if the first cameras are associated with a same camera type as that of the reference camera.

Example 30 includes the subject matter of Example 27, wherein the one or more operations comprise performing matching of second images obtained from second cameras of the multiple camera pairs to the reference image obtained from the reference camera, if the second cameras are closest in distance to the reference camera and of a different camera type as that of the reference camera.

Example 31 includes the subject matter of Example 27, wherein the one or more operations comprise selecting the one or more best camera pairs of the multiple camera pairs for image matching, wherein images from the one or more best camera pairs are determined not to have been previously matched with images from other cameras of the multiple camera pairs.

Example 32 includes the subject matter of Example 27, wherein the one or more operations comprise generating an initial disparity map from independently matching each pixel or block of pixels in one image with each pixel or block of pixels in other images, wherein the initial disparity map is obtained based on an application of a local algorithm.

Example 33 includes the subject matter of Example 27, wherein the one or more operations comprise estimating confidences by detecting inconsistent disparity estimates associated with one or more pixels.

Example 34 includes the subject matter of Example 33, wherein the one or more operations comprise generating, via global optimization, a final disparity map by using the estimated confidences relating to the subset of the set of pixels having inconsistent disparity estimates.

Example 35 includes the subject matter of Example 34, wherein the global optimization comprises solving Markov Random Field (MRF) labeling problems associated with the subset of the set of pixels.

Example 36 includes the subject matter of Example 34, wherein the final disparity map is optionally filtered using one or operations comprising: median filtering, Gaussian filtering, Bilateral filtering, smoothing, and up-sampling.

Some embodiments pertain to Example 37 includes an apparatus comprising: means for selecting a camera to serve as a reference camera, wherein the camera is selected from a plurality of cameras in a hybrid camera array; means for performing matching across images obtained from multiple camera pairs of the plurality of cameras; and means for selecting one or more best camera pairs of the multiple camera pairs based on at least one of placement, type, and history associated with each camera of the multiple camera pairs.

Example 38 includes the subject matter of Example 37, wherein the placement includes distance associated with each camera of the multiple camera pairs, wherein the type includes a camera type associated with each camera of the multiple camera pairs, and wherein the history includes a matching history associated with each camera of the multiple camera pairs.

Example 39 includes the subject matter of Example 37, further comprising means for performing matching of first images obtained from first cameras of the multiple camera pairs to a reference image obtained from the reference camera, if the first cameras are associated with a same camera type as that of the reference camera.

Example 40 includes the subject matter of Example 37, further comprising means for performing matching of second images obtained from second cameras of the multiple camera pairs to the reference image obtained from the reference camera, if the second cameras are closest in distance to the reference camera and of a different camera type as that of the reference camera.

Example 41 includes the subject matter of Example 37, further comprising means for selecting the one or more best camera pairs of the multiple camera pairs for image matching, wherein images from the one or more best camera pairs are determined not to have been previously matched with images from other cameras of the multiple camera pairs.

Example 42 includes the subject matter of Example 37, further comprising means for generating an initial disparity map from independently matching each pixel or block of pixels in one image with each pixel or block of pixels in other images, wherein the initial disparity map is obtained based on an application of a local algorithm.

Example 43 includes the subject matter of Example 37, further comprising means for estimating confidences by detecting inconsistent disparity estimates associated with one or more pixels.

Example 44 includes the subject matter of Example 43, further comprising means for generating, via global optimization, a final disparity map by using the estimated confidences relating to the subset of the set of pixels having inconsistent disparity estimates.

Example 45 includes the subject matter of Example 44, wherein the global optimization comprises solving Markov Random Field (MRF) labeling problems associated with the subset of the set of pixels.

Example 46 includes the subject matter of Example 44, wherein the final disparity map is optionally filtered using one or operations comprising: median filtering, Gaussian filtering, Bilateral filtering, smoothing, and up-sampling.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   at least one processor;
   reference logic to select a camera to serve as a reference camera, wherein the camera is selected from a plurality of cameras in a hybrid camera array;
   selection and computation logic to perform matching across images obtained from multiple camera pairs of the plurality of cameras, wherein the selection and computation logic is further to select one or more best camera pairs of the multiple camera pairs based on at least one of placement, type, and history associated with each camera of the multiple camera pairs; and
   camera type logic to perform matching of first images obtained from first cameras of the multiple camera pairs to a reference image obtained from the reference camera, if the first cameras are associated with a same camera type as that of the reference camera.

2. The apparatus of claim 1, wherein the placement includes distance associated with each camera of the multiple camera pairs, wherein the type includes a camera type associated with each camera of the multiple camera pairs, and wherein the history includes a matching history associated with each camera of the multiple camera pairs.

3. The apparatus of claim 1, further comprising camera distance logic to perform matching of second images obtained from second cameras of the multiple camera pairs to the reference image obtained from the reference camera, if the second cameras are closest in distance to the reference camera and of a different camera type as that of the reference camera.

4. The apparatus of claim 1, wherein the selection and computation logic is further to select the one or more best camera pairs of the multiple camera pairs for image matching, wherein images from the one or more best camera pairs are determined not to have been previously matched with images from other cameras of the multiple camera pairs.

5. The apparatus of claim 1, further comprising computation logic having a local computation module to generate an initial disparity map from independently matching each pixel or block of pixels in one image with each pixel or block of pixels in other images, wherein the initial disparity map is obtained based on an application of a local algorithm.

6. The apparatus of claim 1, further comprising confidence estimation logic to estimate confidences by detecting inconsistent disparity estimates associated with one or more pixels.

7. The apparatus of claim 6, wherein the computation logic further comprises a global computation module to generate, via global optimization, a final disparity map by using the estimated confidences relating to the subset of the set of pixels having inconsistent disparity estimates.

8. The apparatus of claim 7, wherein the global optimization comprises solving Markov Random Field (MRF) labeling problems associated with the subset of the set of pixels.

9. The apparatus of claim 7, wherein the final disparity map is optionally filtered using one or operations comprising: median filtering, Gaussian filtering, Bilateral filtering, smoothing, and up-sampling.

10. A method comprising:
 selecting a camera to serve as a reference camera, wherein the camera is selected from a plurality of cameras in a hybrid camera array;
 performing matching across images obtained from multiple camera pairs of the plurality of cameras;
 selecting one or more best camera pairs of the multiple camera pairs based on at least one of placement, type, and history associated with each camera of the multiple camera pairs; and
 performing matching of first images obtained from first cameras of the multiple camera pairs to a reference image obtained from the reference camera, if the first cameras are associated with a same camera type as that of the reference camera.

11. The method of claim 10, wherein the placement includes distance associated with each camera of the multiple camera pairs, wherein the type includes a camera type associated with each camera of the multiple camera pairs, and wherein the history includes a matching history associated with each camera of the multiple camera pairs.

12. The method of claim 10, further comprising performing matching of second images obtained from second cameras of the multiple camera pairs to the reference image obtained from the reference camera, if the second cameras are closest in distance to the reference camera and of a different camera type as that of the reference camera.

13. The method of claim 10, further comprising selecting the one or more best camera pairs of the multiple camera pairs for image matching, wherein images from the one or more best camera pairs are determined not to have been previously matched with images from other cameras of the multiple camera pairs.

14. The method of claim 10, further comprising generating an initial disparity map from independently matching each pixel or block of pixels in one image with each pixel or block of pixels in other images, wherein the initial disparity map is obtained based on an application of a local algorithm.

15. The method of claim 10, further comprising estimating confidences by detecting inconsistent disparity estimates associated with one or more pixels.

16. The method of claim 15, further comprising generating, via global optimization, a final disparity map by using the estimated confidences relating to the subset of the set of pixels having inconsistent disparity estimates.

17. The method of claim 16, wherein the global optimization comprises solving Markov Random Field (MRF) labeling problems associated with the subset of the set of pixels.

18. The method of claim 16, wherein the final disparity map is optionally filtered using one or operations comprising: median filtering, Gaussian filtering, Bilateral filtering, smoothing, and up-sampling.

19. At least one non-transitory machine-readable medium comprising a plurality of instructions that in response to being executed on a computing device, causes the computing device to carry out one or more operations comprising:
 selecting a camera to serve as a reference camera, wherein the camera is selected from a plurality of cameras in a hybrid camera array;
 performing matching across images obtained from multiple camera pairs of the plurality of cameras;
 selecting one or more best camera pairs of the multiple camera pairs based on at least one of placement, type, and history associated with each camera of the multiple camera pairs; and
 performing matching of first images obtained from first cameras of the multiple camera pairs to a reference image obtained from the reference camera, if the first cameras are associated with a same camera type as that of the reference camera.

20. The non-transitory machine-readable medium of claim 19, wherein the placement includes distance associated with each camera of the multiple camera pairs, wherein the type includes a camera type associated with each camera of the multiple camera pairs, and wherein the history includes a matching history associated with each camera of the multiple camera pairs.

21. The non-transitory machine-readable medium of claim 19, wherein the one or more operations further comprise:
 performing matching of second images obtained from second cameras of the multiple camera pairs to the reference image obtained from the reference camera, if the second cameras are closest in distance to the reference camera and of a different camera type as that of the reference camera; and
 selecting the one or more best camera pairs of the multiple camera pairs for image matching, wherein images from the one or more best camera pairs are determined not to have been previously matched with images from other cameras of the multiple camera pairs.

22. The non-transitory machine-readable medium of claim 19, wherein the one or more operations further comprise:
 generating an initial disparity map from independently matching each pixel or block of pixels in one image with each pixel or block of pixels in other images, wherein the initial disparity map is obtained based on an application of a local algorithm;
 estimating confidences by detecting inconsistent disparity estimates associated with one or more pixels; and generating, via global optimization, a final disparity map by using the estimated confidences relating to a subset of a set of pixels having inconsistent disparity estimates.

23. The non-transitory machine-readable medium of claim 22, wherein the global optimization comprises solving Markov Random Field (MRF) labeling problems associated with the subset of the set of pixels, wherein the final disparity map is optionally filtered using one or operations comprising: median filtering, Gaussian filtering, Bilateral filtering, smoothing, and up-sampling.

* * * * *